United States Patent
Hsieh

(10) Patent No.: US 9,927,886 B2
(45) Date of Patent: Mar. 27, 2018

(54) INPUT DEVICE WITH TRANSMISSION ELEMENT ACTUATED SWITCH

(75) Inventor: Lin-Hsiang Hsieh, Neihu Dist (TW)

(73) Assignee: Synaptics Incorporated, San Jose, CA (US)

( * ) Notice: Subject to any disclaimer, the term of this patent is extended or adjusted under 35 U.S.C. 154(b) by 613 days.

(21) Appl. No.: 12/890,209

(22) Filed: Sep. 24, 2010

(65) Prior Publication Data

US 2012/0075199 A1    Mar. 29, 2012

(51) Int. Cl.
*G06F 3/041* (2006.01)
*G06F 3/0354* (2013.01)

(52) U.S. Cl.
CPC .................. *G06F 3/03547* (2013.01)

(58) Field of Classification Search
None
See application file for complete search history.

(56) References Cited

U.S. PATENT DOCUMENTS

| | | | |
|---|---|---|---|
| 3,133,170 A | 5/1964 | Nanninga | |
| 5,327,161 A | 7/1994 | Logan et al. | |
| 5,374,787 A | 12/1994 | Miller et al. | |
| 5,666,113 A | 9/1997 | Logan | |
| 5,763,842 A | 6/1998 | Tsai et al. | |
| 5,799,772 A | 9/1998 | Sanda et al. | |
| 5,887,995 A | 3/1999 | Holehan | |
| 5,917,906 A | 6/1999 | Thornton | |
| 5,988,902 A | 11/1999 | Holehan | |
| 6,034,672 A | 3/2000 | Gaultier et al. | |
| 6,281,887 B1 * | 8/2001 | Wang | 345/173 |
| 6,393,165 B1 | 5/2002 | Yeh | |
| 6,704,005 B2 | 3/2004 | Kato et al. | |
| 6,733,196 B2 | 5/2004 | Lee et al. | |
| 6,833,522 B1 | 12/2004 | Park et al. | |
| 7,671,837 B2 * | 3/2010 | Forsblad | H03K 17/9622 345/156 |
| 7,978,175 B2 * | 7/2011 | Orsley | 345/157 |
| 2003/0184517 A1 | 10/2003 | Senzui et al. | |
| 2005/0052425 A1 | 3/2005 | Zadesky et al. | |
| 2006/0164400 A1 | 7/2006 | Sun et al. | |
| 2007/0146348 A1 | 6/2007 | Villain | |
| 2007/0236463 A1 | 10/2007 | Villain | |
| 2007/0262968 A1 | 11/2007 | Ohshita et al. | |

(Continued)

FOREIGN PATENT DOCUMENTS

| | | |
|---|---|---|
| WO | 2008138700 A1 | 11/2008 |
| WO | 2008151863 A1 | 12/2008 |
| WO | 2009014271 A2 | 1/2009 |

*Primary Examiner* — Bryan Earles
(74) *Attorney, Agent, or Firm* — FBFK PC

(57) ABSTRACT

An input device, and a method for providing an input device, are provided. The input device includes a touch sensor substrate having a first side and a second side. The second side is opposite the first side. At least one sensor electrode is disposed on the sensor substrate, and the at least one sensor electrode is configured to sense input objects in a sensing region on the first side. A switch is disposed on the second side of the touch sensor substrate. The input device also includes a transmission element having first and second portions. The transmission element is configured such that sufficient depression of the first portion causes the second portion to actuate the switch.

15 Claims, 7 Drawing Sheets

(56) References Cited

U.S. PATENT DOCUMENTS

| | | |
|---|---|---|
| 2008/0088600 A1* | 4/2008 | Prest .................. G06F 3/03547 |
| | | 345/173 |
| 2008/0202824 A1 | 8/2008 | Philipp et al. |
| 2009/0046068 A1 | 2/2009 | Griffin |
| 2009/0046070 A1 | 2/2009 | Griffin |
| 2009/0046071 A1 | 2/2009 | Griffin |
| 2009/0174679 A1 | 7/2009 | Westerman |
| 2010/0085313 A1* | 4/2010 | Rider ............................ 345/173 |
| 2010/0149127 A1* | 6/2010 | Fisher .................. G06F 3/0362 |
| | | 345/174 |
| 2010/0224471 A1* | 9/2010 | Sakai ............................ 200/341 |
| 2010/0283727 A1* | 11/2010 | Jiang et al. .................. 345/156 |

\* cited by examiner

INPUT DEVICE WITH TRANSMISSION ELEMENT ACTUATED SWITCH

FIELD OF THE INVENTION

This invention generally relates to electronic devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

BRIEF SUMMARY OF THE INVENTION

In one embodiment, an input device is provided. The input device comprises a touch sensor substrate, at least one sensor electrode, a switch, and a transmission element. The touch sensor substrate has a first side and a second side, where the second side is opposite the first side. The at least one sensor electrode is disposed on the sensor substrate, and is configured to sense input objects in a sensing region on the first side of the sensor substrate. The switch is disposed on the second side of the touch sensor substrate. The transmission element is configured such that sufficient depression of a first portion of the transmission element causes a second portion of the transmission element to actuate the switch.

The transmission element may be separate and not integral with the touch sensor substrate.

The input device may further comprise a button element that does not overlap the switch. The button element is configured to depress the first portion of the transmission element in response to being depressed.

The input device may further comprise additional sensor electrodes, switches, transmission elements, etc.

In another embodiment, a method for constructing an input device is provided. The input device comprises a support member, a touch sensor substrate, at least one sensor electrode, a switch, and a transmission element. The touch sensor substrate has a first side and a second side that opposes the first side. The at least one sensor electrode is configured to sense input objects in a sensing region on the first side of the touch sensor substrate. The switch is disposed on the second side of the touch sensor substrate. The transmission element is physically distinct from the touch sensor substrate. The method comprises placing the touch sensor substrate and the transmission element with respect to each other such that a first portion of the transmission element does not overlap the switch, and such that sufficient depression of the first portion of the transmission element causes a second portion of the transmission element to actuate the switch. The method also comprises affixing the touch sensor substrate to the support member.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability.

Figure 1:
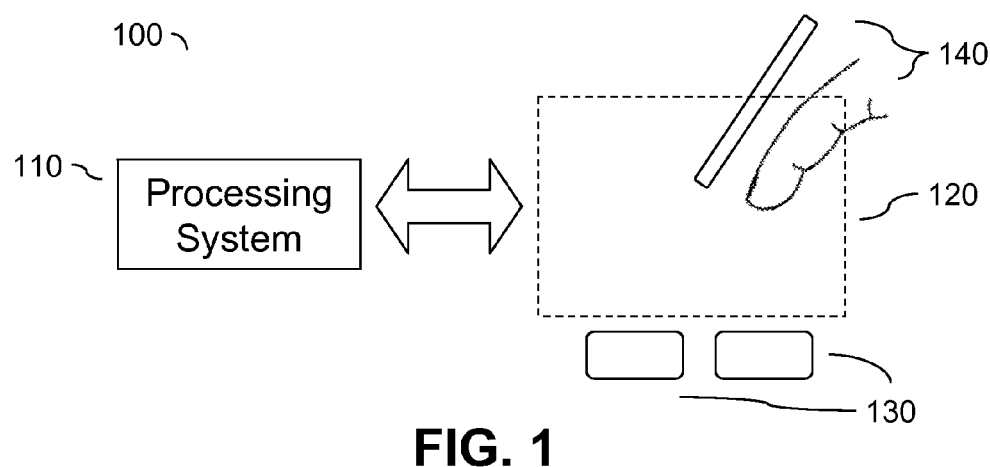
FIG. 1 is a block diagram of an exemplary system that includes an input device in accordance with an embodiment of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastic, resistive, inductive, surface acoustic wave, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitting electrodes and one or more receiving electrodes. Transmitting sensor electrodes may be modulated relative to a reference voltage (e.g., system ground) to facilitate transmission, and receiving sensor electrodes may be held substantially constant relative to the reference voltage to facilitate receipt. Sensor electrodes may be dedicated transmitters or receivers, or may be configured to both transmit and receive.

In FIG. 1, a processing system (or "processor") 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components; in some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Various embodiments of the present invention provide a simpler input device that can be lower cost, easier to assemble, and/or more reliable. Specifically, various embodiments have touch sensor substrates on which switches are disposed, and button elements offset from the switches. Pressing the button elements indirectly actuates the switches. This configuration reduces the need to extend electronics to accommodate switches located directly under the button elements.

Figure 2:
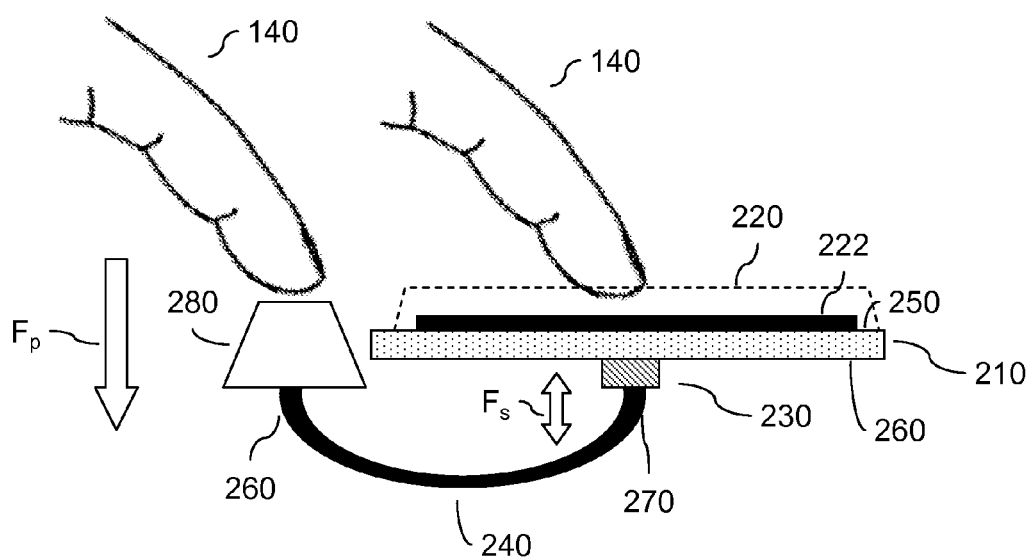
FIG. 2 is a cross-sectional, block diagram view of an exemplary input device in accordance with embodiments of the invention.

Turning now to FIG. 2, various input devices in accordance with embodiments of the invention comprise a touch sensor substrate 210, a sensing region 220 having one or more sensor electrodes 222, a switch 230, and a transmission element 240. The touch sensor substrate has a first side 250 and a second side 260. Generally, the sensing region 220 is on the first side 250. That is, the first side 250 faces the sensing region 220 (and the sensing region 220 may or may not extend to include the surface of the first side 250). The second side 260 is opposite the first side 250. At least one sensor electrode 222 configured to sense input objects 140 in the sensing region 220 is disposed directly or indirectly on the sensor substrate. For example, where the sensor electrode(s) 222 is disposed on the first side 250, the sensor electrode(s) 222 may be directly coupled to the first side 250, or indirectly coupled with intermediate elements lying in-between the sensor electrode(s) 222 and the first side 250. Intermediate elements may include protective layers, adhesives, additional substrates, and the like. Similarly, the switch 230 is disposed directly or indirectly on the second side 260 of the touch sensor substrate 210.

In some embodiments, a cover layer (not shown) is applied over the touch sensor substrate 210. This cover layer helps prevent direct contact between input objects 140 and any conductive material (such as sensor electrodes) on the touch sensor substrate. The cover layer may also have other functions, such as helping to protect the touch sensor substrate, providing a tactilely pleasing input surface, etc.

The transmission element has a first portion 260 and a second portion 270. The transmission element is configured such that sufficient depression of the first portion 260 causes the second portion 270 to actuate the switch 230.

In some embodiments, the switch 230 is configured to be actuated by a force or motion along a switch actuation direction $F_s$.

The switch 230 may be binary (ON-OFF) or have three or four or more discrete switching levels. The switch 230 may use any appropriate technology. Examples include tactile switches such as snap domes and various types of microswitches. Other examples include electrical user-contact switches and membrane switches.

Further examples of switch technology include those capable of even higher resolution that are quantized or thresholded to produce switch-like functionality. For example, a capacitive switch may be formed by a pair of conductive patches on the touch sensor substrate 210, where capacitive coupling between the conductive patches change with the proximity of the second portion 270 of the transmission element 240. As another example, readings from force sensors such as strain gauges or load cells, or displacement sensors such as linear position sensors, may be processed to provide the switch functionality.

Switch actuations may trigger responses such as selection, emulation of mouse button clicks, command confirmations, and the like. Switch responses may also be dependent on the level of actuation or the context. Example context parameters include which window is active (or has the focus), which software application is active (or has the focus), which function is running, which options are available to the user, the degree of switch actuation (e.g., which may vary with the amount of force or displacement sensed), position(s) of one or more input objects in the sensing region, a combination thereof, or the like.

Any appropriate transmission element motion may be used to facilitate the second portion 270 of the transmission element 240 actuating the switch 230 in response to depression of the first portion 260 of the transmission element. In various embodiments, various parts of the transmission 240 element may deform, deflect, translate, rotate, or the like, when the first portion 260 of the transmission element 240 is depressed.

Some embodiments further comprise a button element 280 configured to be contacted by a user. The button element 280 is configured to depress the first portion 260 of the transmission element 240 in response to being pushed. For example, in some embodiments, an input object 140 applying a sufficiently large force component (in a press direction Fp) to button element 280 causes the first portion 260 to depress and the second portion 270 to actuate the switch 230. Generally, the press direction Fp and a switch actuation direction Fs are different directions, although that is not always the case. The button element 280 may have various sub-elements. For example, the button element may comprise a structural portion and a tactile feedback portion disposed on the structural portion.

And, in some embodiments, the button element 280 does not overlap the switch 230. That is, the switch 230 has an actuation direction $F_s$. And, two-dimensional projections of the button element 280 and the switch 230, along the actuation direction $F_s$, onto the plane perpendicular to the actuation direction $F_s$, do not overlap each other.

Some embodiments further comprise a support member (not shown) affixed directly or indirectly to the touch sensor substrate 210. The transmission element 240 is coupled to this support member, and the first portion 260 and second portion 270 are moveable relative to this support member. The support member may be part or all of a holder component (e.g. a bracket) separate from a casing of the electronic system. Alternatively, the support member may be a portion of a casing of the electronic system. The support member may comprise any suitable material, including various metals (e.g., steel, aluminum) and polymers (e.g., various plastics).

Parts of the input device 200 may be integral with each other or physically distinct from each other. Integral parts are portions of one unified body formed of a same piece of material. For example, any combination of the sensor substrate 210, the sensor electrode(s) 220, the switch 230, the transmission element 240, or other elements present in the input device 200, may be integral with each other.

For example, in some embodiments, the transmission element 240 is not integral with the touch sensor substrate 210. That is, the transmission element 240 and the touch sensor substrate 210 are physically distinct from each other, and are not portions of one unified body formed of a same piece of material.

As another example, in some embodiments, the transmission element 240 and the button element are portions of one integral component. As a further example, in some embodiments, the transmission element 240 and the support member are portions of one integral component.

In some embodiments, the sensing region 220 is associated with an input surface, such as the surface of a touchable cover layer applied over the first side 250 of the touch sensor substrate 210. A user applying sufficient force on the touch sensor substrate 210 causes the switch 230 or another switch to actuate, and indicate that the user has pressed on the input surface with sufficient force.

As a specific example, in some embodiments, the switch 230 is placed behind an input surface that is constrained to move substantially repeatably in response to force applied to the touch sensor. For example, the input surface may be attached to the touch sensor substrate 210, and the touch sensor substrate may be constrained in degrees of freedom. The transmission element 240 may be likewise constrained in motion such that it will not move substantially when the switch is pressed against it. Force applied to the input surface is transmitted to the touch sensor substrate 210, which translates and actuates the switch 230 against the transmission element 240.

Such an input device may be used to supply a clickable input surface that enhances usability. Motion of an input surface may be implemented in various ways. For example, the input device may or may not be designed to provide substantially uniform translation in response to force applied to different locations across an input surface of the input device. For example, a hinge may be formed on one side of the input surface, such that pressing on the input surface causes it to rotate about the hinge. As another example, a scissors mechanism may be used to couple a touch sensor substrate with an input surface to a base. As yet another example, a linear slide may constrain the motion of a touch sensor substrate carrying an input surface, such that the touch sensor substrate does not tilt, twist, or yaw in response to force applied to the input surface.

Figure 3:
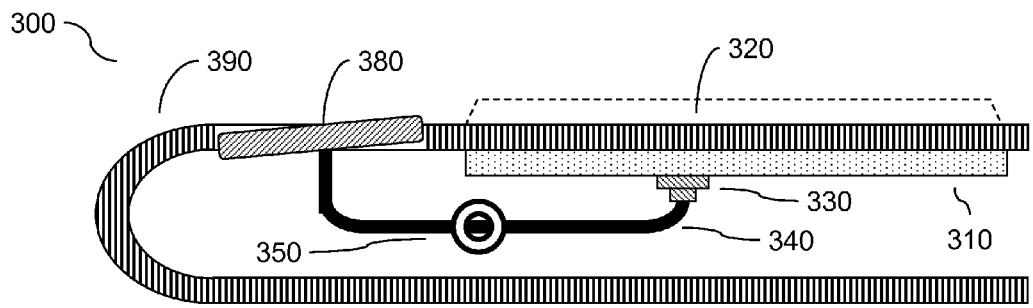
FIGS. 3-4 are cross-sectional, block diagram views of two exemplary systems that include input devices in accordance with embodiments of the invention.
Figure 4:
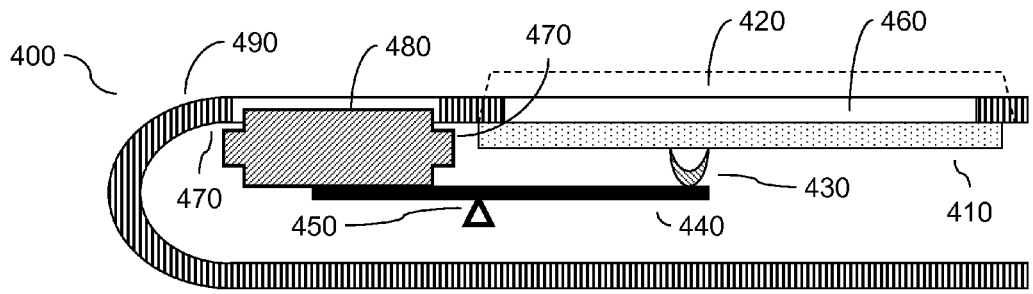

FIGS. 3 and 4 show two non-limiting example configurations 300 and 400 possible in embodiments of input device 200. FIGS. 3 and 4 are meant to show some options possible for embodiments in accordance with the invention. Thus, embodiments in accordance with the present invention may use any appropriate combinations of options shown in or described in conjunction with FIGS. 3 and 4 or any other figure in this document.

FIG. 3 shows an example configuration 300 comprising a sensor substrate 310, at least one sensor electrode (not shown), a tact switch 330, and a transmission element 340. The at least one sensor electrode is disposed on the sensor substrate 310, and is configured to detect input in the sensing region 320 through a casing 390. FIG. 3 also shows a button element 380 affixed to the transmission element 340 and a pivot 350 about which the transmission element 340 moves.

FIG. 4 shows an example configuration 400 comprising a sensor substrate 410, at least one sensor electrode (not shown), a snap dome switch 430, and a transmission element 440. The at least one sensor electrode is disposed on the sensor substrate 410, and is configured to detect input in the sensing region 420 through an opening 460. FIG. 4 also shows a button element 480 affixed to the transmission element 440 and a pivot 450 about which the transmission element 440 moves. A casing 490 surrounds these elements.

As shown in FIGS. 3 and 4, the transmission elements of some embodiments are akin to levers coupled to pivots. And, when the first portion of a transmission element is depressed in such embodiments, the transmission element rotates or deforms (or both) about the pivot to actuate the switch. In the example configuration 300, the pivot 350 wholly constrains the translational freedom of the transmission element 340. In the example configuration 400, the pivot 450 does not wholly constrain the translation freedom of the transmission element 440. The interfaces 470 between the button element 480 with the casing 490 help limit the motion of the transmission element 440.

Instead of or in addition to levers and pivots, other embodiments may utilize linkages with various degrees of freedom, e.g., joints or interfaces that slide as well as rotate, cam mechanisms, and the like.

Figure 5:
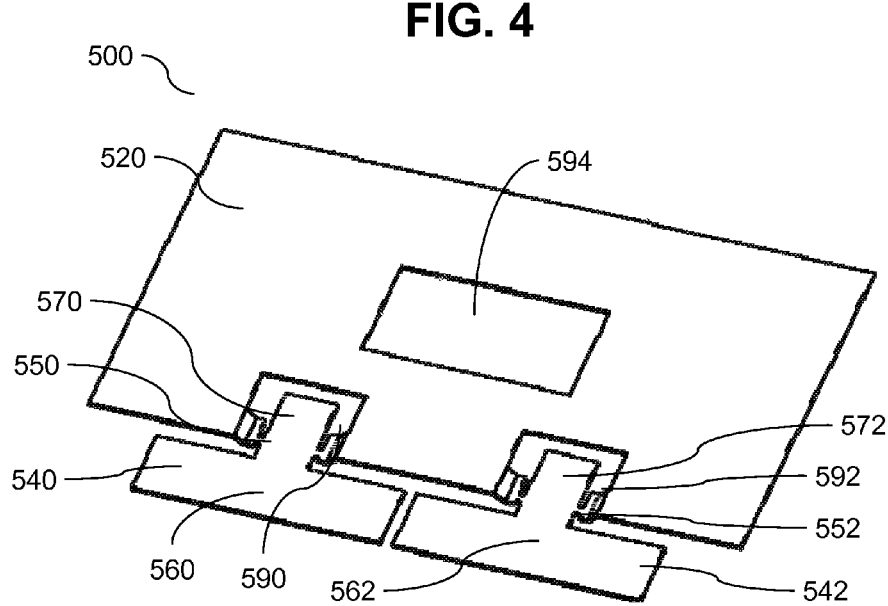
FIGS. 5-9 are isometric views of parts of an input device in accordance with an embodiment of the invention.

FIGS. 5-9 illustrate various components of an input device 500 in accordance with an embodiment of the invention. FIG. 5 illustrates a support member 520 of the input device 500. As shown, the support member 520 is substantially rectangular in shape and about the same size as the touch sensor substrate (not shown) of the input device 500. The support member 520 has an opening 594 at a central portion and two other openings 590 and 592 at an outer portion. These openings may be used to provide clearance or access. For example, the opening 594 may provide clearance for electrical components on the touch sensor substrate 510 which poke into the opening 594, thus facilitating a thinner overall input device stack-up. As another example, the opening 594 may provide access for entry by other components (e.g. flex cables to connectors). As yet another example, the openings 590 and 592 may provide access to facilitate switch actuation.

The support member 520 also includes two transmission elements 540 and 542. The transmission element 540 is connected to the support member 520 at a pivot 550. The transmission element 540 has a first portion 560 and a second portion 570. In this example, the transmission element 540, the pivot 550, and the support member 520 are integral. In some embodiments, the transmission element 540, the pivot 550, and the support member 520 are all stamped out of a piece of metal (e.g. a piece of steel, a multi-layer sandwich of metal). In some embodiments, the transmission element 540, the pivot 550, and the support member 520 are parts of a single cast or machined structure. In some embodiments, the transmission element 540, the pivot 550, and the support member 520 are parts of a single injection molded plastic structure.

In this example, the transmission element 540, its first portion 560 and second portion 570, and its associated pivot 550, are configured similarly.

Figure 6:
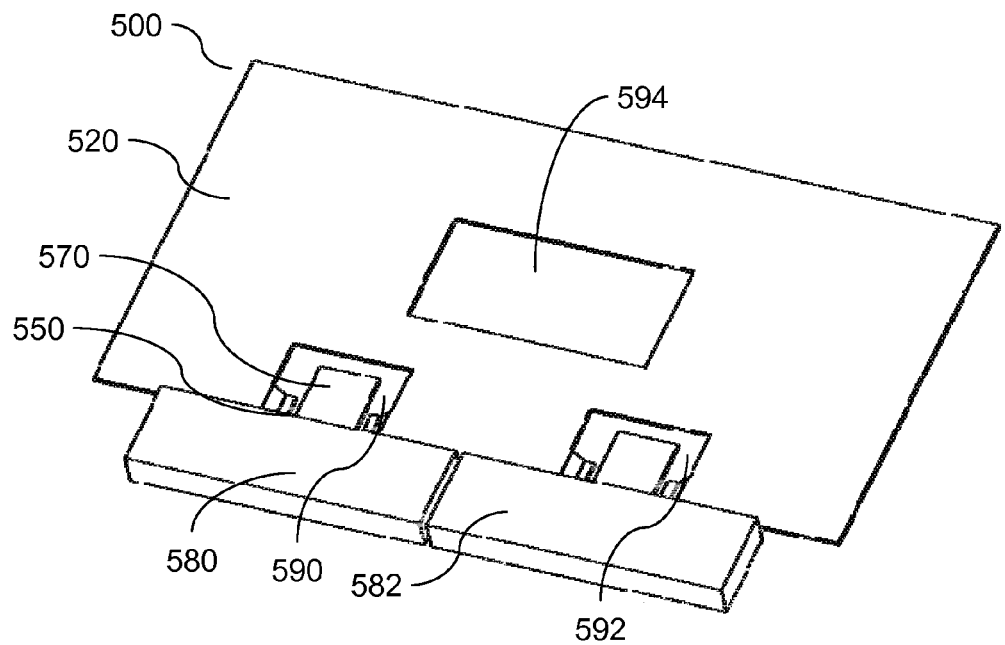

FIG. 6 shows a button element 580 attached to the first portion 560 of the transmission element 540 and a second button element 582 attached to the first portion 560 of the transmission element 542.

Figure 7:
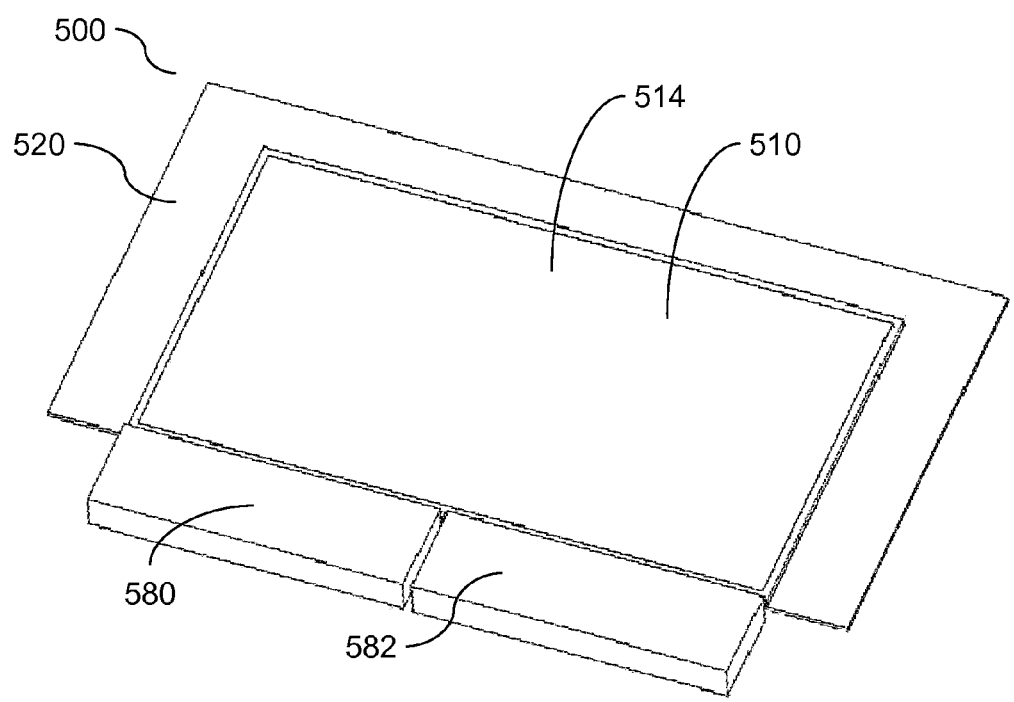

FIG. 7 shows a touch sensor substrate 510 disposed on the support member 520. The touch sensor substrate 510 has disposed on a first side one or more sensor electrodes for sensing input objects near the sensor electrode(s). A physical cover layer 514 is applied to the touch sensor substrate 510, and provides an input surface for users. In this example, the dimensions of the support member 520, the pivots 550 and 552, the transmission members 540 and 542, and the button elements 580 and 582 have been engineered such that the touch sensor substrate 510 is slightly below the level of the button elements 580 and 582. This introduces a depression around the input surface that helps to indicate the location of the input surface to the user.

Figure 8:
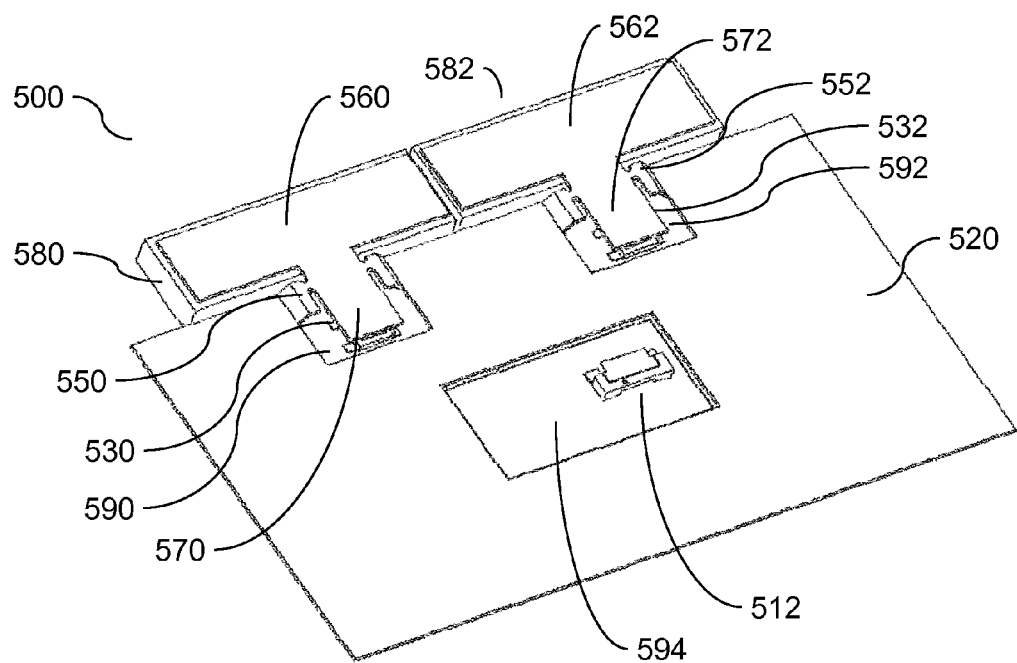

FIG. 8 shows a perspective view of the other side of the input device 500, with the touch sensor substrate 510 disposed on the support member 520. From this second side, the switches 530 and 532 mounted on the second side of the touch sensor substrate 510 are visible and accessible through the openings 590 and 592. In some cases, the switches 530 and 532 intrude into the openings 590 and 592. The switches 530 and 532 may be actuated by depression of the button elements 580 and 582, respectively.

In this example, another electrical component 512 is mounted on the second side of the touch sensor substrate 510 and makes use of the clearance offered by the opening 594. That is, it is positioned at least partially within the opening 594. In FIG. 8, the electrical component 512 is a connector.

The switches 530 and 532 are positioned close to (or directly above) the second portions 570 and 572 of the transmission elements 540 and 542, respectively. The button elements 580 and 582 do not overlap these switches 530 and 532.

During operation, input objects in the sensing region of the input device 500 are detected by the sensor electrode(s) on the touch sensor substrate. Depression of the button element 580 (e.g., due to user-applied force on the button elements 580 and 582) is transmitted to the first portion 560, and causes the transmission element 540 to move in a gimbal-like way about the pivot 550. This gimbal-like motion is enabled in the input device 500 by local material deformation at and near the pivot 550. The distances from the pivot 550 to the first portion 560 and the second portion 570 are roughly equal, and thus yield a pseudo-lever arm ratio of about 1:1. Assuming that the pivot 550 is ideal to provide a rough estimate, the second portion 570 thus moves toward the switch 530 and/or applies force to the switch 530 that is about equal in magnitude as experienced by the first portion 560. Sufficient depression of the button element 580 causes the second portion 570 to move and actuate the switch 530. In some cases, the second portion 570 moves sufficiently to make use of the clearance offered by the opening 590.

In this example, where the amount of movement is small, the motion can be roughly characterized as follows. As the button element 580 and the first portions 560 of the transmission element 540 are depressed (i.e., moved in a first direction), the second portion 570 of the transmission element 540 is moved in a substantially opposite direction). Sufficient movement of the second portion 570 of the transmission elements 540 actuates the switch 530. To actuate the switch 530, the user applies input to a portion of the input device 200 (i.e., the button element 580) that does not overlap the switch 530.

Figure 9:
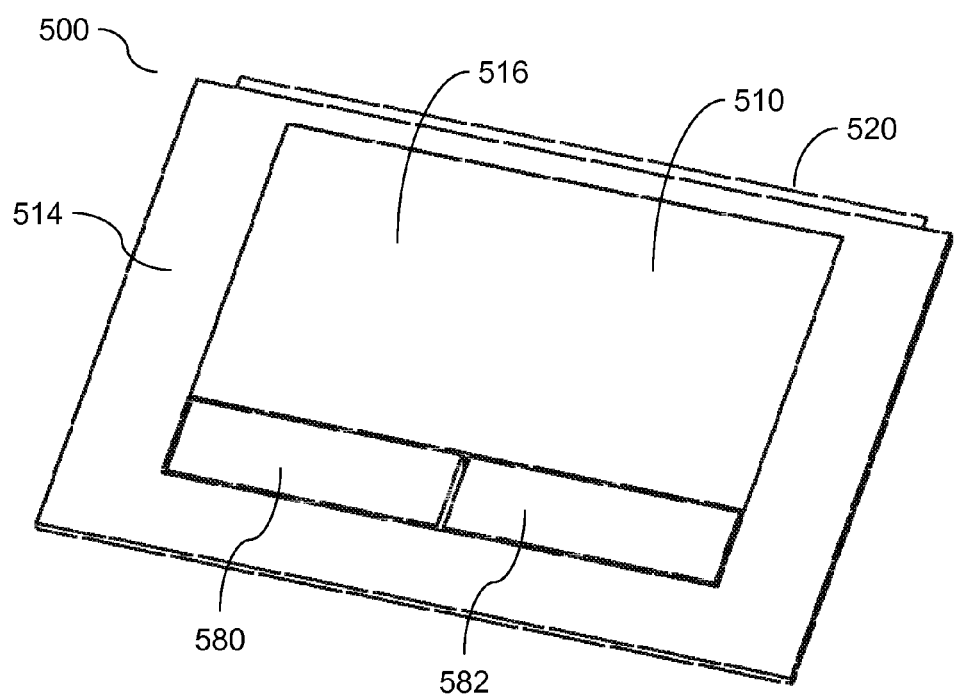

FIG. 9 shows a part of a casing 514 disposed over the support member 520. The casing 514 has a bezel opening 516 through which the input surface of the cover layer over the touch sensor substrate 510 can be contacted by input objects. In some embodiments, the part of the casing 514 shown is part of a palm rest of a casing of an electronic system such as a web browser device or a laptop computer.

Figure 10:
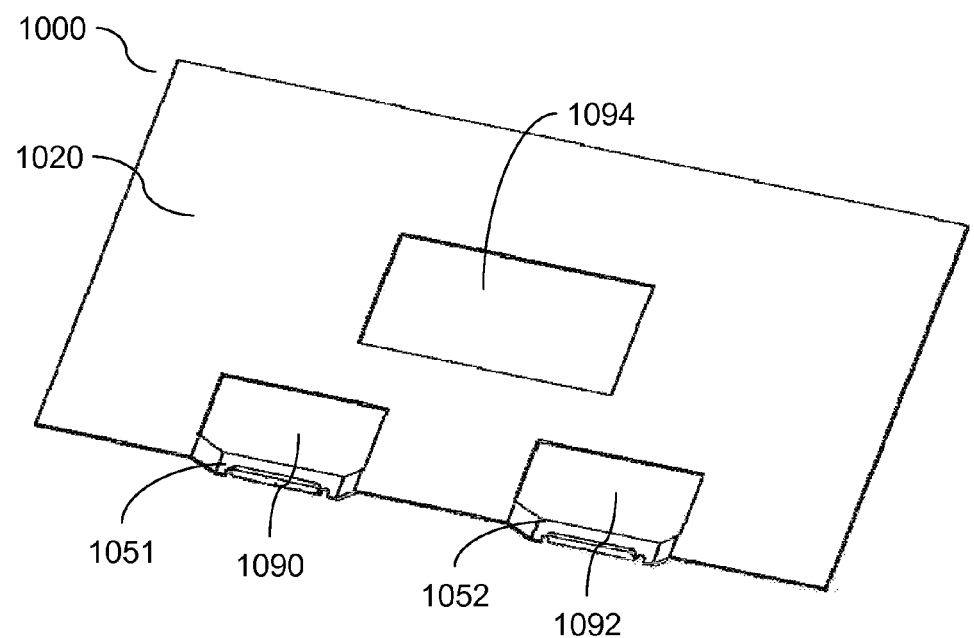
FIGS. 10-12 are isometric views of parts of an input device in accordance with another embodiment of the invention.
Figure 11:
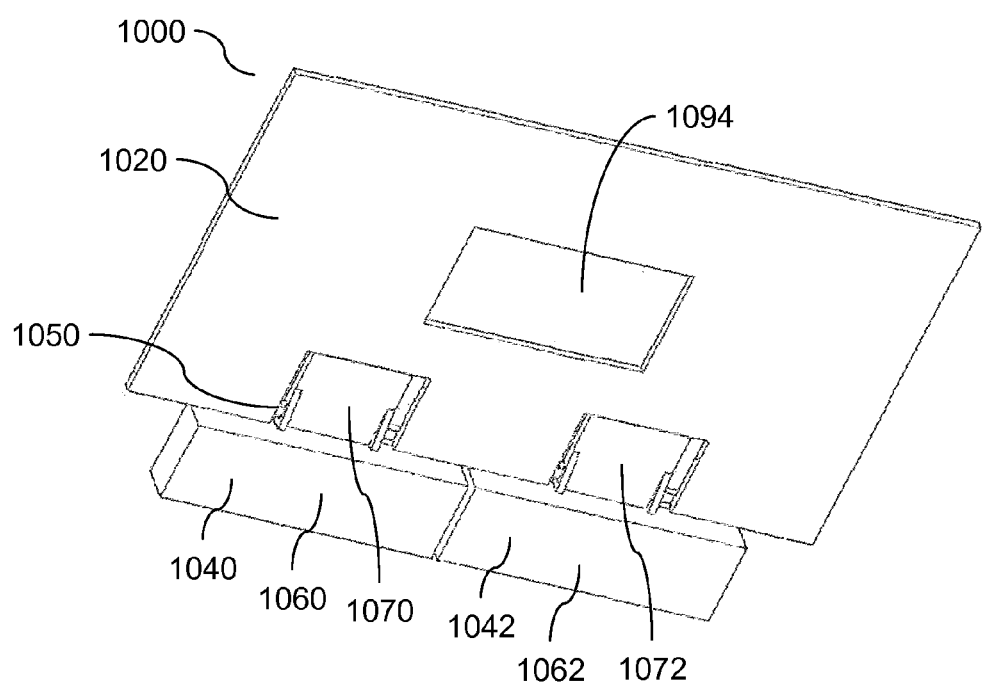
Figure 12:
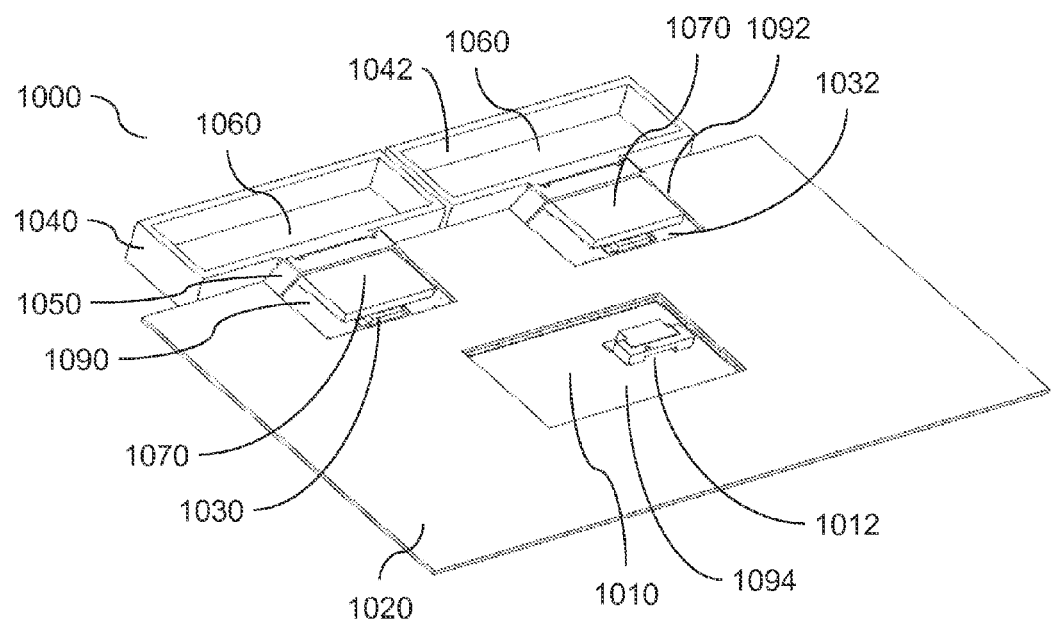

FIGS. 10 to 12 illustrate another example input device 1000, in accordance with the invention. In this example, the transmission elements are integral with their respective button elements, and are not integral with the support member. FIG. 10 shows the support member 1020. The support member 1020 has pivot portions 1051 and 1052, an opening 1094, and two additional openings 1090 and 1092. FIG. 11 shows the components 1040 and 1042 assembled with the support member 1020. The components 1040 and 1042 are each a combined button element and transmission element. Components 1040 and 1042 each has a first portion 1060 or 1062 configured to be contacted and pressed by users, and a second portion 1070 or 1072. The components 1040 and 1042 may be assembled with the support member 1020 in any appropriate way, including by pins, slots and inserts, fasteners, friction or snap fits, and the like.

FIG. 12 shows a view from the other side of the support member 1020. In this FIG., the touch sensor substrate 1010 has also been affixed to the touch sensor support 1020. From this perspective, the switches 1030 and 1032 that are affixed to the touch sensor substrate 1010 are partially visible. These switches 1030 and 1032 are configured to be actuated by the second portions 1070 and 1072 (respectively), when users have adequately pressed the first portion 1060 or 1062 (respectively). Also visible in FIG. 12 is an electrical component 1012 attached to the touch sensor substrate 1010. This electrical component 1012 makes used of the clearance offered by the opening 1094.

The support member 1020 may be made of any appropriate material, including various metals or plastics. The components 1040 and 1042 may each be made from a single, integral piece of material. For example, the components 1040 and 1042 may be each a single piece of plastic.

The operation of the components 1040 and 1042 to actuate the switches 1030 and 1032 is substantially analogous to that of the input device 500. However, instead of localized deformation, most of the motion of the components 1040 and 1042 is due to relative motion (which can be mostly rotation) between the components 1040 and 1042 about the pivot portions 1051 and 1053. The assembly of the rest of the parts of the input device 1000 may be similar or different from what is described for the input device 500.

Figure 13:
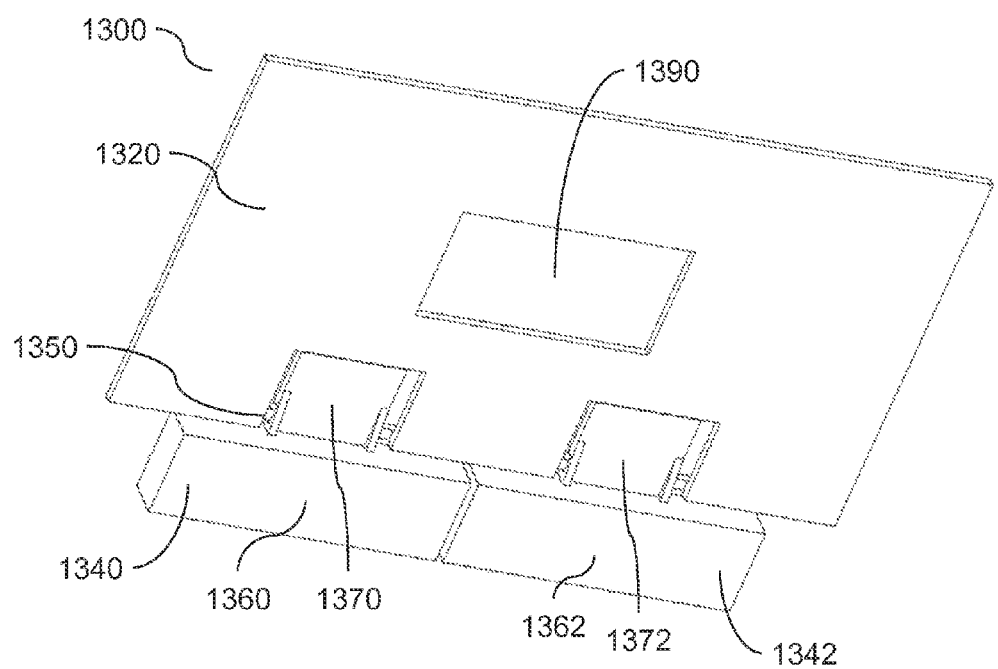
FIG. 13 is an isometric view of a support member of an input device in accordance with a further embodiment of the invention.

FIG. 13 illustrates a part of an input device 1300 according to a further embodiment. Specifically, FIG. 13 shows an integral piece that includes the support member 1320, the pivots 1350 and 1352, and combination transmission elements plus button elements 1340 and 1342. That is, all of these items that were separate pieces in earlier examples are now unified into one component and made from the same material. This integral piece may be made of any appropriate material, including various polymers and laminations.

The operation of the combination transmission elements plus button elements 1340 and 1342 is similar to what is described for the input device 500. A user pressing the first portions 1360 or 1362 causes the second portions 1370 and 1372 to move in a lever-like manner and actuate associated switches (not shown). The assembly of the rest of the parts of the input device 1300 may be similar or different from what is described for the input device 500.

Figure 14:
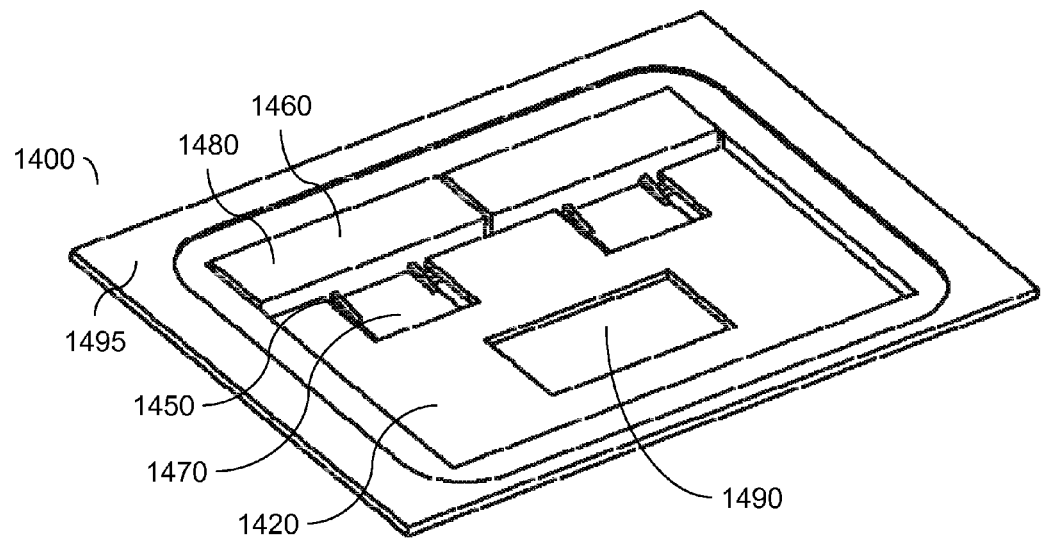
FIGS. 14 and 15 are isometric views of parts of an input device in accordance with yet another embodiment of the invention.
Figure 15:
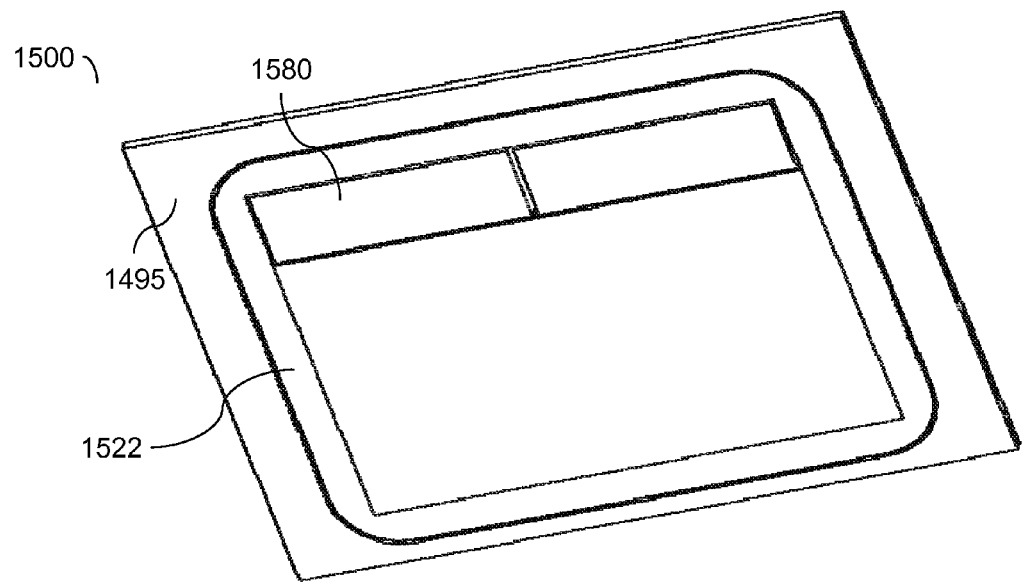

FIGS. 14 and 15 illustrate an input device 1400 according to yet another embodiment where a casing 1495 of an electronic system is integral with the support member 1420, the pivots 1450 and 1452, and combination transmission elements plus button elements 1440 and 1442. The part of the casing 1495 shown may be any appropriate part of the electronic system housing. For example, where the electronic system is a laptop computer, the part of the casing 1495 shown may be a portion of a palmrest.

The assembly and operation of the input device 1400 may be similar to what is described for the input device 1300.

The input devices described herein may be made in any of a variety of appropriate ways. For example, a method for constructing an input device in accordance with embodiments of the invention comprises: placing a touch sensor substrate and a transmission element with respect to each other, and affixing the touch sensor substrate to the support member. The placement of the touch sensor substrate and the transmission element with respect to each other is such that a first portion of the transmission element does not overlap an associated switch disposed on the touch sensor substrate, and such that sufficient depression of the first portion of the transmission element causes a second portion of the transmission element to actuate the switch.

The method may further comprise physically coupling the transmission element to the support member. The method may further comprise affixing a button element to the transmission element.

The above is but an example method, and other alternatives exist. For example, the steps described may be performed in the order described or in some other order. Further, additional steps may be added for some embodiments, or some steps described may not be present in some embodiments. As specific examples, different manufacturing processes may include steps such as positioning electronic components such as switches, connectors, ASICs, etc. and affixing them (e.g. by solder, adhesive, potting material, etc.). As other examples, manufacturing processes may also include forming the various components, such as the casting, stamping, or machining of metal-based support members, the molding of the button elements or casing, etc.

Similarly, the input devices 500, 1000, 1300, and 1400 are just some specific examples in accordance with some embodiments of the invention. As explained above and below, many other alternatives, such as non-lever methods of transmitting press input, are available.

Even within the general configurations set out for each of the input devices 500, 1000, 1300, and 1400, many alternatives are available. As some non-limiting examples of alternatives, the various input device components may have different lengths, widths, thicknesses, areas, volumes, shapes, finishes, relative positions, or other configuration parameters. As additional examples, any number of transmission elements, button elements, or switches may be used and located as appropriate. For example, alternatives with one, two, or three button elements set out on a same edge may emulate single-button element mice, two-button element mice, or three-button element mice, respectively. As another example, alternatives with button elements along different edges may process user input on button elements along a first edge to complement user input in the sensing region, and process user input on button elements along a different edge to complement user input elsewhere (e.g., on another input device).

As yet further examples, switches may be actuated by force instead of macroscopic motion, casings may not have bezel openings (such that the sensor electrode(s) on the touch sensor substrate senses through these casings), input surfaces associated with sensing regions may or may not be at the same level as the button elements, and touch sensor substrate may have a different number of sensor electrode(s). Also, the electrical component 512 may not be present, may be a different type of connector, or may not be a connector (e.g., be a capacitor, resistor, IC, etc.). And, where levers are used, the pivots may be more or less ideal, the pseudo-lever arm ratios may differ substantively from 1:1.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. An input device comprising:
   a touch sensor substrate having a first side and a second side, the second side opposite the first side;
   a sensor electrode disposed on the first side of the touch sensor substrate and configured to sense input objects in a sensing region on the first side;
   an input surface above the sensor electrode on the first side of the touch sensor substrate;
   a transmission element not integral with the touch sensor substrate and comprising a first portion and a second portion; and
   a switch disposed on the second side of the touch sensor substrate and configured to be actuated by:
      a first method comprising moving the touch sensor substrate and the switch disposed on the second side of the touch sensor substrate towards the transmission element in response to a user force applied to the input surface,
      wherein the switch is actuated against the transmission element when the switch reaches the transmission element; and
      a second method comprising rotating the second portion of the transmission element about a pivot in response to a user depression associated with the first portion,
      wherein the switch is actuated against the second portion when the second portion reaches the switch, and
      wherein the transmission element and the pivot are all portions of one integral component, and wherein the transmission element is configured to rotate in a gimbal motion about the pivot due to local material deformation proximate the pivot.

2. The input device of claim 1, further comprising:
   a button element configured to depress the first portion of the transmission element in response to the user depression.

3. The input device of claim 2, wherein the button element is integral with a casing of an electronic system.

4. The input device of claim 1, further comprising:
   a support member affixed to the touch sensor substrate, wherein the transmission element is moveably coupled to the support member.

5. The input device of claim 4, wherein the transmission element and the support member are portions of one integral component.

6. The input device of claim 4, wherein the support member is integral with a casing of an electronic system.

7. The input device of claim 1, wherein the switch comprises a snap dome.

8. An input device comprising:
   a touch sensor substrate comprising a first side and a second side opposite the first side;
   a sensor electrode disposed on the first side of the touch sensor substrate and configured to sense input objects in a sensing region located on the first side of the touch sensor substrate;
   a switch physically coupled to the second side of the touch sensor substrate;
   a button element located such that it does not overlap the switch;
   a transmission element having a first portion coupled to the button element and a second portion;
   a pivot, wherein depression of the button element by a user causes the second portion of the transmission element to rotate about the pivot towards the switch, and wherein the switch is actuated against the second portion when the second portion reaches the switch; and
   an input surface coupled to the touch sensor substrate,
   wherein the touch sensor substrate is configured to move towards the transmission element in response to a user force applied to the input surface,
   wherein the switch is actuated against the transmission element when the switch reaches the transmission element,
   wherein the transmission element, the pivot, and the button element are all portions of one unified body formed from the same piece of material, and
   wherein the transmission element is configured to rotate in a gimbal motion about the pivot due to local material deformation proximate the pivot.

9. The input device of claim 8, further comprising:
   a support member affixed to the touch sensor substrate, wherein the transmission element is moveably coupled to the support member.

10. The input device of claim 9, wherein the transmission element and the support member are portions of one integral component.

11. The input device of claim 8, wherein the transmission element is coupled to the pivot.

12. The input device of claim 9, wherein the support member is a portion of a casing of an electronic system.

13. A method for operating an input device comprising an input surface, a switch, a sensor electrode, and a button element, the method comprising:
   transmitting a user force applied to the input surface to a touch sensor substrate (TSS) comprising a first side and a second side, wherein the sensor electrode is disposed on the first side, wherein the switch is disposed on the second side, and wherein the input surface is above the sensor electrode;

moving, in response to the user force, the TSS and the switch towards a transmission element comprising a first portion and second portion, wherein the switch is actuated against the transmission element when the switch reaches the transmission element;

transmitting a user depression applied to the button element to the first portion of the transmission element; and rotating the second portion of the transmission element about a pivot in response to transmitting the user depression, wherein the switch is actuated against the second portion when the second portion reaches the switch.

14. The method of claim 13, wherein the switch comprises a snap dome.

15. The method of claim 13, wherein the button element is integral with a casing of an electronic system.

* * * * *